No. 854,139. PATENTED MAY 21, 1907.
F. BAILEY & F. H. JACKSON.
CLUTCHING DEVICE.
APPLICATION FILED NOV. 30, 1906.

2 SHEETS—SHEET 2.

WITNESSES:
Edward Hay
Bertram Martin

INVENTORS:
Frank Bailey
Frederick Henry Jackson

UNITED STATES PATENT OFFICE.

FRANK BAILEY AND FREDERICK HENRY JACKSON, OF LONDON, ENGLAND.

CLUTCHING DEVICE.

No. 854,139.   Specification of Letters Patent.   Patented May 21, 1907.

Application filed November 30, 1906. Serial No. 345,794.

*To all whom it may concern:*

Be it known that we, FRANK BAILEY and FREDERICK HENRY JACKSON, subjects of the King of Great Britain and Ireland, and residing at 64 Bankside, in the county of London, England, have invented new and useful Improvements in Clutching Devices Adapted for Use in Communicating Rotary Motion and in Controlling the Transmission Thereof, of which the following is a specification.

This invention relates to the transmission of rotary motion by means of apparatus adapted to act as a positive clutch or to operate on the principle of the hydraulic clutch; the motion in the latter case being communicated through the medium of a liquid or other fluid which is confined, partially confined or practically unconfined, according to whether it is desired that the motion should be transmitted at the same speed, transmitted at a reduced speed or not transmitted.

Apparatus constructed in accordance with our present invention is capable of transmitting motion at any desired ratio between "full slip" and "full drive;" and, upon reaching the last mentioned state, of changing from a hydraulic clutch to a positive or mechanical clutch.

Figure 1:
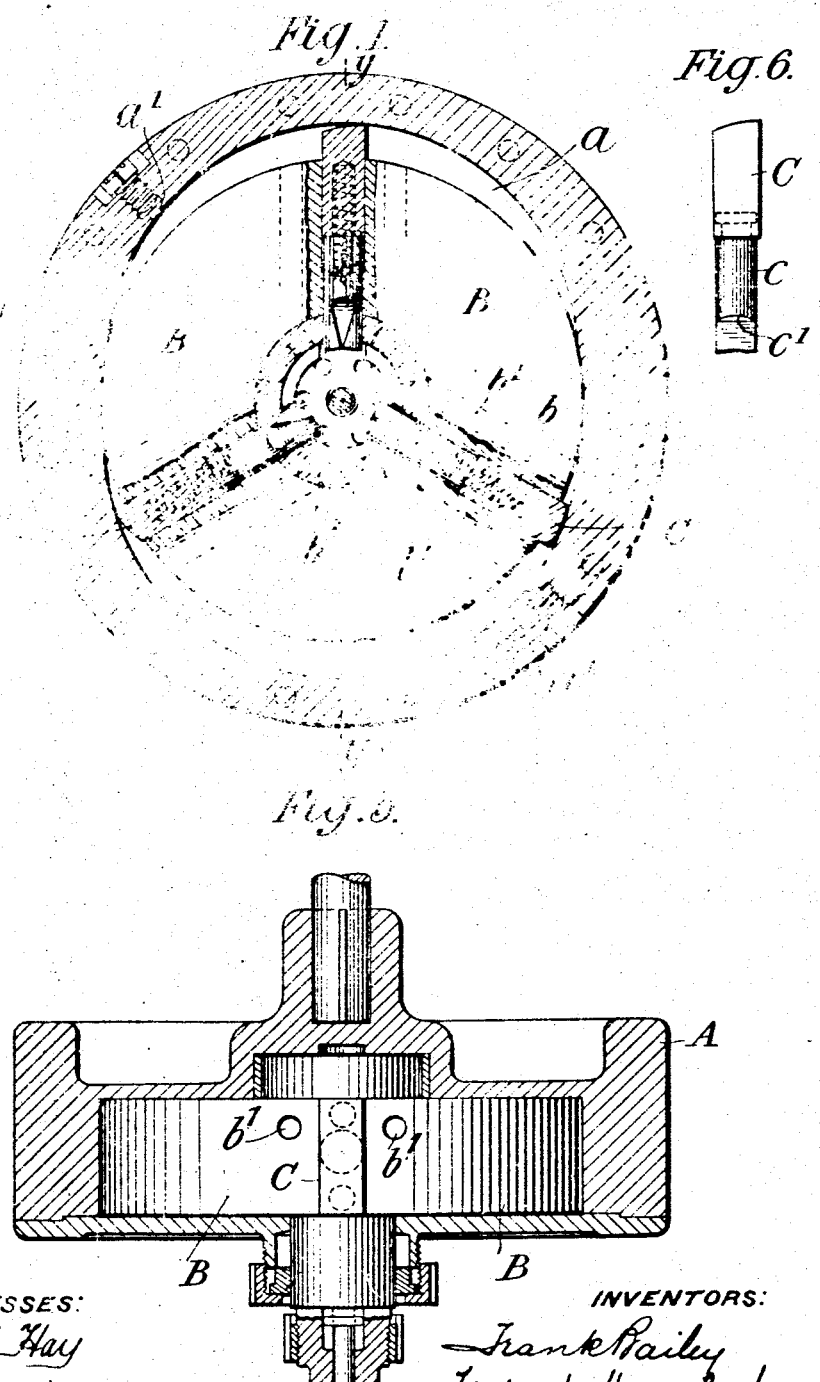
Figure 2:
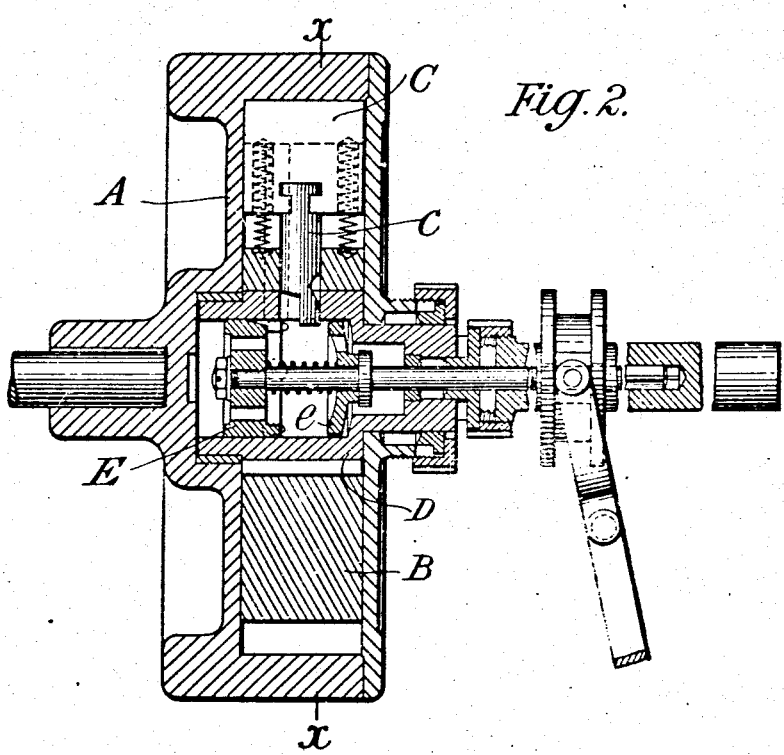

In the accompanying drawings, Figure 1 is a transverse section on the line $x$—$x$ in Fig. 2, Fig. 2 is a longitudinal section on the line $y$—$y$ in Fig. 1 of clutch apparatus constructed according to our improved method; Fig. 3 being a sectional plan, and Figs. 4, 5 and 6, detail views hereinafter more particularly described.

According to the mode of carrying out our invention, illustrated in the accompanying drawings, the device comprises a casing A formed with a chamber $a$ which incloses a closely fitting circular disk B; the said chamber having one or more enlargements of a circular but eccentric character. The disk B is formed with radial slots $b$ in which slab-like pistons C slide; the sides of the said pistons closely fitting the inner sides of the casing. When the disk B revolves in relation to the casing A or the casing revolves about the disk, as the case may be, the pistons C if uncontrolled in the manner hereinafter described, sweep the eccentric or other enlargement or enlargements of the central chamber $a$.

The disk B is mounted upon a hollow shaft D and is provided with radial passages $b'$ whereby communication is established between the peripheral exterior of the disk and the interior of the hollow shaft; such communication being, however, under the control of a piston-valve E with which the interior of the shaft is fitted.

Figure 4:
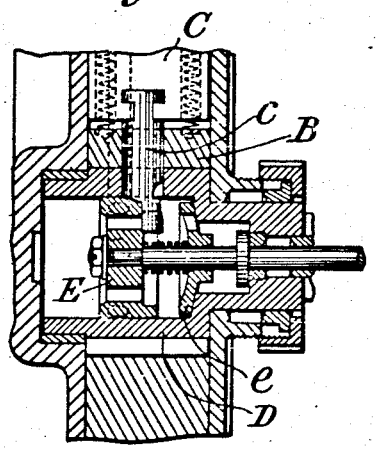
Figure 5:
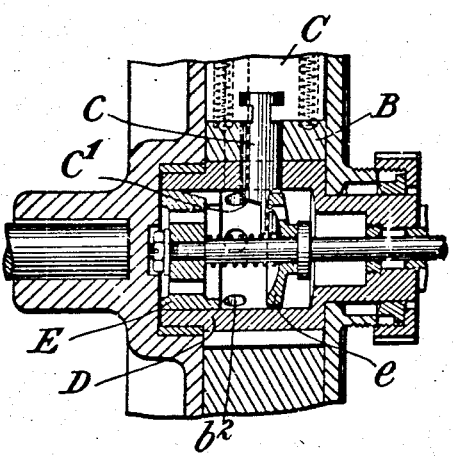

The inner sides of the slab-like pistons C are formed with stems $c$ which project radially inward, toward the axis of the disk B, and protrude into the interior of the hollow shaft D. Opposite the piston-valve E is a disk $e$ adapted to press against and frictionally to engage the sides of the said stems $c$ when the valve is fully open, as shown in Fig. 5, with the effect that the pistons C are, under such conditions, held out of operation. The stems before referred to and the piston-valve E are moreover formed in such a manner in relation to one another that, cutting off the parts $b^2$ of the radial passages $b'$, the piston-valve E may be further advanced so as to intercept the inward movement of the piston-stems $c$ and thus, by holding the pistons C in their protruded positions, as shown in Fig. 4, to prevent the disk B in which they are mounted being rotated within the circular chamber. Fig. 6 is an elevation of the piston C showing the shoulder $c'$ with which the valve E engages.

The action of the apparatus is as follows:— The circular casing A with its enlargement or enlargements, as also the hollow shaft D, having been charged with oil or other suitable liquid or fluid, which may be introduced through openings $a'$ in the casing, the disk with its sliding pistons C is free to rotate within the casing so long as the piston-valve E remains open as shown in Fig. 5; the fluid circulating to and fro through the radial passages $b'$ formed in the body of the disk. When, however, the piston-valve E is closed, so as to cut off communication through these passages, as shown in Fig. 4, the casing A is caused to rotate with the disk B. When communication through the radial passages $b'$ is partially intercepted by reason of the piston-valve E being partially closed, as shown in Fig. 2, the rotative movement of the disk B is communicated to the casing A, or vice versa, but at a more or less reduced speed, according to the degree of throttling effected by the piston-valve. When it is desired to substitute a positive or mechanical "full drive" for the hydraulic "full drive," the piston-valve E is advanced so as to occupy the position shown in Fig. 4 and to intercept the inward movement of one or another of the stems c with which the inner sides of the slab-like pistons C are provided. Under such circumstances, the piston C pertaining to the piston-stem c so intercepted is retained in its protruded position in one of the eccentric enlargements in the casing; the disk B and its casing A thus becoming locked together and compelled to revolve in unison. It will be understood that these elements pertain to the respective members of the clutch; one being in connection with the driving part, while the other is in connection with the driven part.

What we claim as our invention and desire to secure by Letters Patent, is:—

1. The herein described clutching device, comprising an eccentrically formed casing or chamber a disk inclosed by said chamber slab-like pistons slidably mounted in said disk a central chamber in said disk fitted with a piston or other suitable valve, and passages which extend from the said central chamber to the periphery of the said disk, such passages terminating at their inner ends in ports capable of being controlled by the piston-valve, and opening at their outer ends to the eccentrically formed casing or chamber.

2. In hydraulic clutch mechanism, the combination with an eccentrically formed casing and a disk inclosed within said casing and furnished with slab-like pistons, of a controlling valve and means operating in conjunction with said valve for engaging the piston-stems and holding one or more of them against the internal periphery of the said casing, substantially as and for the purpose described.

3. In hydraulic clutch mechanism the combination with an eccentrically formed casing and a disk inclosed within said casing and furnished with slab-like pistons, of a controlling valve and a disk mounted on the controlling valve-spindle; the said disk being adapted to engage with the piston-stems when the controlling valve is in position for "full slip," substantially as and for the purpose herein described.

In testimony whereof we have signed our names to this specification in the presence of two subscribing witnesses.

FRANK BAILEY.
FREDERICK HENRY JACKSON.

Witnesses:
H. D. JAMESON,
F. L. RAND.